April 3, 1956 S. H. WELSH 2,740,579
PORTABLE CIRCULATING BLOWER FOR SPACE HEATERS
Filed Aug. 18, 1952 2 Sheets-Sheet 1
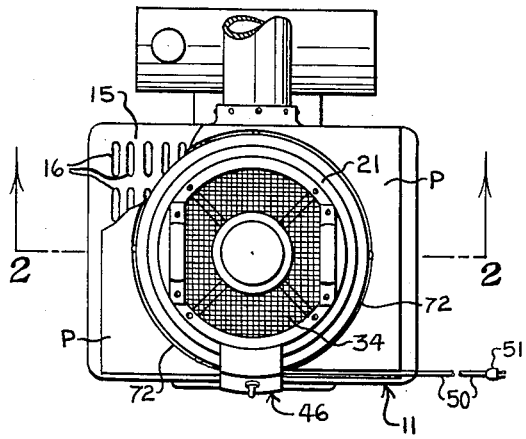
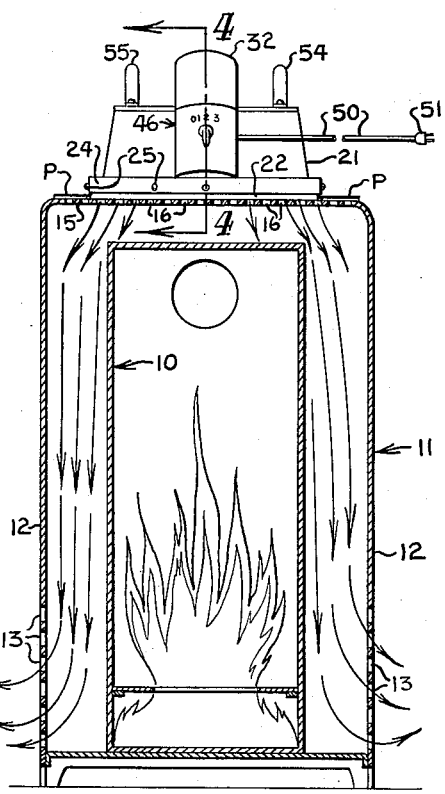
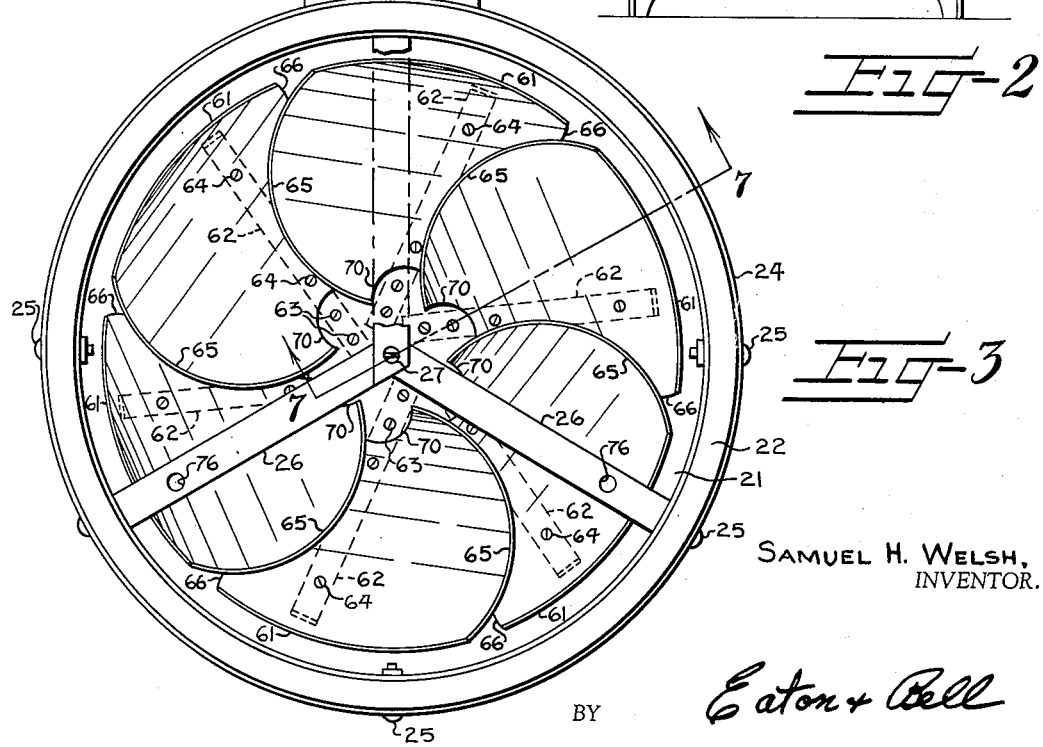
SAMUEL H. WELSH,
INVENTOR.
BY Eaton + Bell
ATTORNEYS

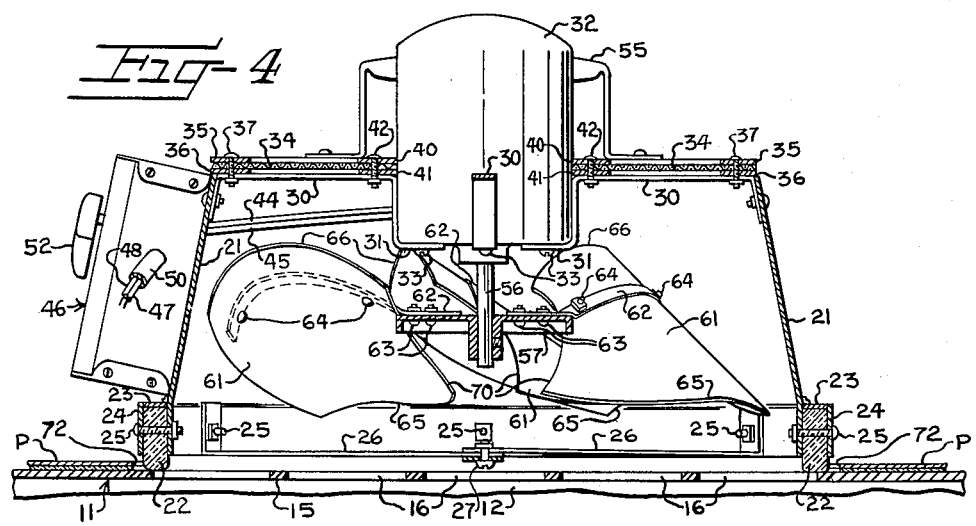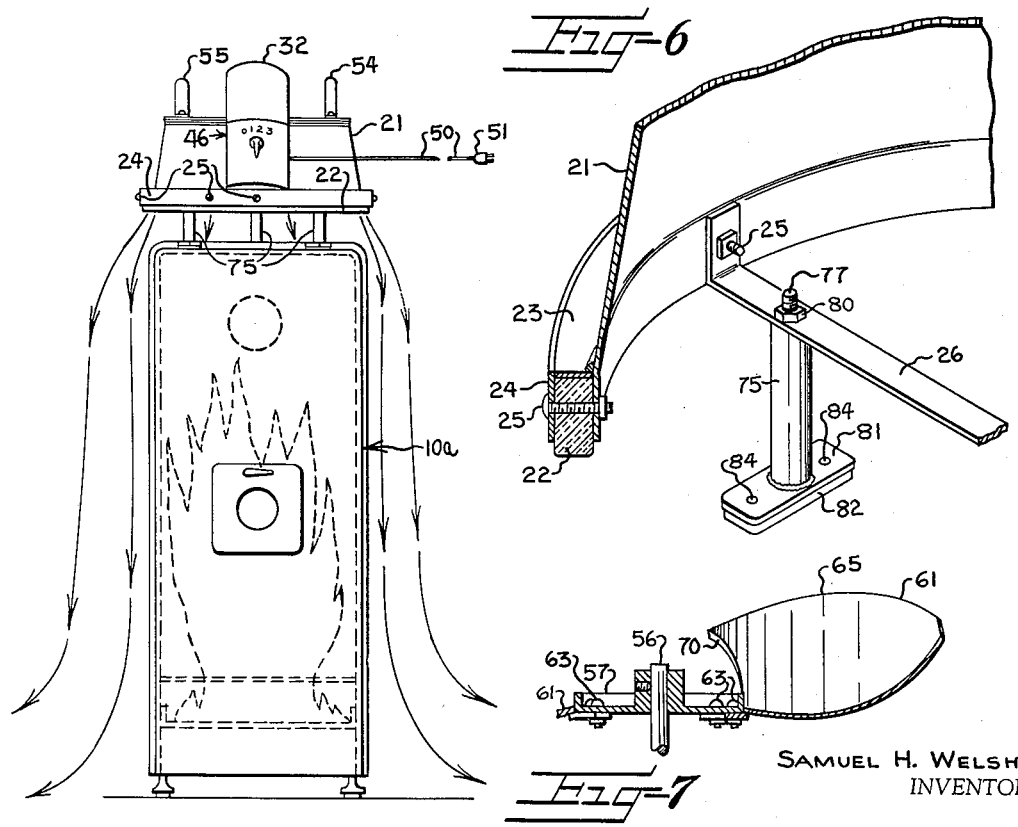

United States Patent Office 2,740,579
Patented Apr. 3, 1956

2,740,579

PORTABLE CIRCULATING BLOWER FOR SPACE HEATERS

Samuel H. Welsh, Lumberton, N. C.

Application August 18, 1952, Serial No. 305,018

3 Claims. (Cl. 230—117)

This invention relates to air circulating blowers and more especially to a blower which is especially adapted to be placed on top of a space heater or furnace for directing a continuous flow of air downwardly around the heating chamber and toward the floor on which the heater rests, thus increasing the efficiency of the heater by preventing the heat from rising from the heater to the ceiling of the room in which the heater is disposed.

It is an object of this invention to provide a blower for space heaters comprising a frusto-conical tubular housing which is open at its large end, which large end serves as the bottom of the fan housing when said housing is positioned upon a space heater. The small or upper end of the housing is covered with a suitable foraminated material, such as a close mesh wire screen, and has means for supporting an electric motor which drives a rotary blade assembly or fan. Thus, the fan draws the air through the screen or foraminated material at the small or upper end of the housing and the tapered wall of the housing causes the air to be directed downwardly and outwardly around the heating chamber of the furnace as the air is moved by the fan or rotary blade assembly.

Some types of heaters include a heating chamber which is disposed within a housing or jacket, the walls of which are spaced around the heating chamber and the upper wall of which is provided with openings therein and the lower portions of the side walls of which are also provided with openings. Other types of heaters merely include the heating chamber and do not have a jacket disposed around the heating chamber.

In order to accommodate said blower in association with a space heater comprising a heating chamber which is not surrounded by a jacket, the blower has a plurality of removable legs secured to the housing thereof, the lower ends of which are provided with feet to the lower surfaces of which a suitable asbestos material is suitably secured and which asbestos material rests upon the heating chamber of the heater, thus maintaining the lower open end of the blower housing in spaced relation to the upper end of the heating chamber so the air may be blown from said housing and downwardly adjacent the side walls of the heater and, thus, to the floor of the room in which the heater is disposed.

It is another object of this invention to provide a blower comprising a frusto-conical housing which is open at its upper and lower ends, a suitable screen being secured to the open upper end of the housing and means being provided for supporting an electric motor, to the shaft of which a fan assembly is secured. The fan assembly comprises a plurality of blades so shaped as to cause the air to be directed outwardly away from the center of the fan assembly so that, when the blower is positioned atop the furnace or space heater, instead of the air being directed downwardly directly onto the center of the upper wall of the heater, the air is directed outwardly and caused to pass downwardly adjacent the outer walls of the space heater to the floor of the building in which the heater is disposed.

Some of the objects of the invention having been stated, other objects will appear as the description proceeds when taken in connection with the accompanying drawings, in which—

Figure 1 is a top plan view of a space heater showing the jacket or housing thereof with the improved blower resting thereupon;

Figure 2 is a vertical sectional view taken along the line 2—2 in Figure 1, but showing the improved blower in elevation;

Figure 3 is an enlarged inverted plan view of the improved blower disassociated from the space heater or furnace;

Figure 4 is an enlarged vertical sectional view through the heater and blower taken substantially along the line 4—4 in Figure 2, but showing the switch and electric motor in elevation;

Figure 5 is an elevation of a space heater showing the improved blower as it is mounted directly upon the heating chamber;

Figure 6 is a fragmentary isometric view showing a portion of the blower housing and showing the manner in which the removable legs for the blower are constructed;

Figure 7 is a fragmentary vertical sectional view taken substantially along the line 7—7 in Figure 3 and showing, particularly, the contour of one of the fan blades.

Referring more specifically to the drawings, the numeral 10 indicates a heating chamber of a furnace or space heater which, in the form of the invention shown in Figures 1 and 2, is surrounded by a jacket or housing broadly designated at 11 and which includes vertical walls 12 spaced from the heating chamber 10 and being provided with a plurality of openings 13 adjacent the lower edges thereof. The upper ends of the walls 12 are connected to a top wall 15 which is usually provided with a plurality of openings 16 therein. Heretofore, the cool air has been drawn into the jacket 11 and then heated by the heating chamber 10 after which the heated air passed upwardly through the openings 16 in the top wall 15 of the jacket 11. In order to increase the efficiency of the space heater or furnace, it is the object of this invention to cause the air to move in the opposite direction from that in which it normally moves, as indicated by the many arrows in Figures 2 and 5.

To this end, I have provided an improved blower especially adapted to be positioned upon the perforated top wall 15 of the jacket 11 and above the heating chamber 10. The improved blower comprises a frusto-conical tubular housing 21 which is preferably, but not necessarily, made from sheet metal, and the lower open end of which is preferably of substantially greater diameter than the upper end thereof. An insulation ring 22 is suitably secured to and projects downwardly beyond the lower portion of the housing 21.

There are many different ways in which the insulation ring 22 may be secured to the lower portion of the frusto-conical housing 21 and, in the preferred embodiment of the invention, an annular flange 23 is suitably secured to the frusto-conical tubular housing 21 and spaced upwardly from the lower edge thereof and against which the upper edge of the insulation ring 22 is positioned. Thereafter, a flexible band 24 of rigid material, such as steel and the like, is positioned around the insulation ring 22 and against the outer edge of the flange 23 and the band 24 and the insulation ring 22 are secured to the outer surface of the lower portion of the frusto-conical wall 21 by any suitable means such as bolts 25.

In order to lend rigidity to the lower portion of the wall of the housing 21, a plurality of radial braces 26 are suitably secured at their outer ends to the inner surface of the wall of the housing 21 and their proximal ends are suitably secured to each other, as by a bolt 27, there being three of said braces 26 illustrated in Figure 3. The outer ends of a plurality of circularly spaced upper radial braces 30 are also secured to the inner surface of the wall of the housing 21 adjacent the upper end thereof, and these braces 30 extend inwardly and are then bent downwardly and inwardly, successively, to form motor support portions 31, to the upper surfaces of which an electric motor 32 is suitably secured, as by screws 33.

In order to prevent objects from falling into the housing, a foraminated cover or screen 34 is provided, which is secured between a pair of upper and lower outer screen supporting rings or frame members 35 and 36 whose outer edges are substantially flush with the outer edge of the screen 34. The screen supporting rings 35 and 36 clampingly engage opposite sides of the screen 34 and are held in clamped position, by any suitable means such as bolts 37, which also serve to secure the screen frame rings 35 and 36 to the upper surfaces of the upper braces 30. The outside diameters of the rings 35 and 36 are preferably substantially the same as the outside diameter of the upper end of the housing 21.

It will be noted that the motor 32 projects upwardly through an opening formed in the center of the screen 34 and which opening is framed by inner screen frame members or support rings 40 and 41 which are also clamped to the upper and lower surfaces of the screen 34, by any suitable means such as bolts 42, which bolts 42 also penetrate the corresponding upper braces 30. The electric motor 32 has wires or electrical conductors 44 and 45 extending therefrom which penetrate the wall of the frusto-conical housing 21 and are connected to opposite sides of a variable-speed-manually-operable switch generally designated at 46. This switch 46 may also be termed as a manually adjustable rheostat.

The switch 46 has wires or conductors 47 and 48 extending therefrom, which wires preferably extend through a cable 50 and are connected at their ends remote from the switch 46 to a plug 51 adapted to be plugged into a suitable source of electrical energy, not shown.

Any desired type of switch may be provided for controlling the electric motor 32 and, in the present instance, the switch 46 has a control knob 52 thereon which is movable to four different positions, including an "off" position and three additional positions, in the latter three of which the motor is caused to operate at varying speeds. Since any type of switch may be employed, a detailed illustration and description thereof is deemed unnecessary.

Suitable handles 54 and 55 are suitably secured to the upper surface of the screen frame ring 35 to facilitate moving the blower from one place to another, as desired.

The motor 32 has a shaft 56 extending therefrom, on the lower end of which a disk 57 is fixedly mounted, which disk forms a part of a fan assembly broadly designated at 60. The fan assembly 60 also includes a plurality of radially extending circularly spaced blades 61 which are shaped in a manner peculiar to the present invention as will be presently described. In order to secure each of the blades 61 to the disk 57, a suitable strap member 62, of rigid material, is secured at one end thereof to the upper surface of the disk 57 (Figure 4) as by bolts 63, and these braces or strap members 62 extend substantially radially from the disk 57 and are curved to conform to the corresponding blades 61 and are suitably secured to said blades, as by bolts 64.

The trailing edge of each blade 61 is indicated at 65 and the leading edge thereof is indicated at 66. The axis of each blade 61 extends at an angle relative to the axis of the disk and said axis of each blade 61 also extends substantially parallel to an imaginary line tangent to the disk 57. In order to direct the air displaced by said fan assembly 60 downwardly and outwardly when the blower is positioned atop the top wall 15 of the jacket 11, each of the blades 61 is arcuate in cross-section relative to said axis thereof and curves outwardly and upwardly when in inverted position as shown in Figure 7. Of course, this indicates that the blades 61 curve outwardly and downwardly when the blower is in operative position, as shown in Figures 2 and 4.

Thus, the trailing edge 65 of each blade extends in overlapping relation to the leading edge 66 of the next succeeding blade as the blades 61 move in a clockwise direction in Figure 3 and, of course, adjacent blades are spaced from each other at their junctures. The trailing portion of each of the blades 61, which extends outwardly relative to the disk and the motor 32, is provided with a downwardly and inwardly curved tail portion 70 which extends inwardly beyond the vertical plane of the periphery of the disk 57. Thus, as the fan assembly 60 rotates in a clockwise direction in Figure 3, the tail portion 70 on each of the blades 61 tends to deflect the air radially of the axis of the fan assembly 60 while the arcuate cross-sectional configuration of the blades 61 causes the air drawn through the screen 34 to be directed outwardly substantially parallel to the axis of the blade assembly 60, with the result that the air tends to move generally in an outwardly and downwardly curving path which is further induced by the tapered wall of the tubular housing 21.

Thus, the housing 21 may be placed with its insulation ring 22 against the upper surface of the top wall 15 of the jacket 11 and the air will be directed downwardly by the fan assembly 60 and caused to flow downwardly and outwardly past the walls of the heating chamber 10. In actual operation, the tail portions 70 on each of the blades 61 tend to create a negative pressure or to cause the air to flow toward the center of the disk 57 while the air is caused to flow outwardly from the center of the fan assembly and is then blown downwardly and outwardly as it leaves the blower.

If so desired, a suitable plate P may be positioned upon the upper surface of the top wall 15 of the jacket 11 to close those openings 16 therein which are not disposed within the circle defined by the insulation ring 22, the plate P being provided with a suitable circular opening 72 within which the insulation ring 22 of the blower may be positioned when said blower is resting upon the top wall 15 of the jacket 11.

Now, referring to Figure 5, there is shown a space heater of a type comprising a heating chamber 10a having suitable heating means therein, but which is devoid of a jacket such as the jacket 12 shown in Figure 2. Thus, in order to permit the air discharged from the blower to flow downwardly past the side walls of the heating chamber 10a, a plurality of removable legs 75 are provided for supporting the blower in spaced relation above the upper wall of the heating chamber 10a.

It will be observed in Figure 3 that each of the lower radial braces 26 has a hole 76 therein in which a reduced threaded portion 77 on each of said legs 75 is positioned and which is secured to the corresponding brace 26 by a nut 80 (Figure 6).

Each of the legs 75 has a transverse plate or foot 81 suitably secured to the lower end thereof, as by welding, and to the lower surface of each of the feet 81 a pad 82 of insulation material is suitably secured as by rivets 84.

It is thus seen that the improved blower can be positioned directly upon the heating chamber of a furnace or upon the jacket of the furnace or space heater and, in the first instance, the insulation pads 82 on the feet 81 of the legs 75 prevent the heat generated in the heating chamber 10a from being conducted to the housing 21 and the parts associated therewith. In the latter instance, the insulation ring 22 also prevents the heat from being transmitted from the jacket to the housing 21 and associated parts of the blower. Thus the handles 54 and 55 will remain sufficiently cool so that the blower may be removed from the space heater at any time, as desired, and this also prevents the motor 32 from becoming overheated.

In the drawings and specification there has been set forth a preferred embodiment of the invention and, although specific terms are employed, they are used in a generic and descriptive sense only and not for purposes of limitation, the scope of the invention being defined in the claims.

I claim:

1. A portable blower adapted to be positioned upon space heaters comprising a tubular housing made from relatively thin material and adapted to be positioned on a vertical axis, a plurality of radially extending braces connected at their outer ends to the housing adjacent the upper end thereof, an electric motor carried by said braces, a shaft extending downwardly from the electric motor and being driven by said electric motor, and a fan assembly fixed on said shaft and so arranged as to draw air through the upper end of the housing and to blow the air through the lower end of the housing, and said fan including a plurality of circularly arranged blades each having a downwardly and inwardly curved tail portion at its innermost corner at the trailing edge thereof to direct the air outwardly radially from the center of said fan assembly as it is directed downwardly generally parallel to the axis of said fan assembly.

2. A portable blower adapted to be positioned upon space heaters comprising a frusto-conical tubular housing made from relatively thin material and adapted to be positioned on a vertical axis with the large end thereof facing downwardly, a plurality of radial braces connected at their outer ends to the housing adjacent the small end thereof, an electric motor carried by said braces, a shaft extending downwardly from the electric motor and driven by said electric motor, a fan fixed on said shaft and so arranged as to draw air through the upper small end of the housing and to blow the air through the large lower end of the housing whereby said frusto-conical housing will tend to direct the air radially and downwardly through said housing, a second plurality of radial braces fixed at their outer ends to said housing adjacent the large end thereof, a plurality of legs fixed to said second plurality of radial braces, and an insulation member fixed on the lower free end of each leg.

3. A portable circulating blower adapted to be positioned upon a space heater comprising a frusto-conical tubular housing having a large open lower end and a relatively smaller open upper end, an insulation ring carried by the lower portion of said housing and projecting downwardly beyond the large lower end of said housing, a plurality of radially extending upper braces carried by said housing and projecting inwardly from said housing, an axially located electric motor carried by the proximal ends of said radial braces, a shaft extending downwardly from said motor toward the large end of the frusto-conical housing, a fan assembly fixed on said shaft and comprising a disk, a plurality of circularly arranged radially extending blades fixed on said disk, each of said blades being curved in cross-section, the axis of each of said curves extending parallel to a line tangent to said disk, each of said blades extending at an angle relative to a line parallel to the axis of said disk, the trailing edge of each of said blades having a curved tail portion on the corner thereof adjacent said disk and extending inwardly beneath said disk, the tail being curved in a substantially shorter radius than the general curvature of the corresponding blade, whereby rotation of said blades will cause the air to be directed away from the axis of the fan assembly as well as being directed downwardly, and said frusto-conical housing serving to further induce the flow of the air in an outward and downward path relative to the axis of the fan assembly.

References Cited in the file of this patent

UNITED STATES PATENTS

| | | |
|---|---|---|
| 925,327 | Glantzberg | June 15, 1909 |
| 1,790,021 | Robinson | Jan. 27, 1931 |
| 2,169,232 | Flanders | Aug. 15, 1939 |
| 2,227,765 | Schmidt | Jan. 7, 1941 |
| 2,435,645 | Bergstrom | Feb. 10, 1948 |
| 2,553,278 | Rogant | May 15, 1951 |